United States Patent
Nagayasu et al.

(10) Patent No.: US 6,309,770 B1
(45) Date of Patent: Oct. 30, 2001

(54) SOLID ELECTROLYTE FUEL CELL POWER GENERATING SYSTEM

(75) Inventors: Hiromitsu Nagayasu; Hitoshi Miyamoto; Yasuhiko Ikemoto, all of Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/250,988

(22) Filed: Feb. 16, 1999

(30) Foreign Application Priority Data

Feb. 17, 1998 (JP) .................................. 10-034396

(51) Int. Cl.⁷ ............................. H01M 8/10; H01M 8/18
(52) U.S. Cl. .................. 429/19; 429/13; 429/17; 429/26; 429/20; 429/34
(58) Field of Search ................. 429/13–17, 19–26, 429/20–34

(56) References Cited

U.S. PATENT DOCUMENTS

| 4,128,700 | * 12/1978 | Sederquist | 429/17 |
| 5,079,103 | 1/1992 | Schramm | 429/17 |

FOREIGN PATENT DOCUMENTS

| 0 404 712 A2 | 12/1990 | (EP) . |
| 0404 712 A3 | 12/1990 | (EP) . |
| 63166158 | 9/1988 | (JP) . |
| 3-95867 | 4/1991 | (JP) ............... H01M/8/06 |
| 3-236164 | 10/1991 | (JP) ............... H01M/8/04 |
| 4-190570 | 7/1992 | (JP) ............... H01M/8/04 |
| 06124719 | 6/1994 | (JP) . |
| 06203845 | 7/1994 | (JP) . |
| 07230819 | 8/1995 | (JP) . |
| 08/62135 A | 6/1996 | (JP) ............... H01M/8/04 |
| 09293525 | 11/1997 | (JP) . |

\* cited by examiner

Primary Examiner—Mark F. Huff
Assistant Examiner—Daborah Chacko-Davis
(74) Attorney, Agent, or Firm—Anderson, Kill & Olick, P.C.

(57) ABSTRACT

A solid electrolyte fuel cell power generating system comprising a solid electrolyte fuel cell containing an anode, an anode fuel inlet and an anode exhaust gas outlet, a fuel source in communication with the anode inlet, a cathode, a cathode oxidant inlet and a cathode exhaust oxidant outlet, an oxidant source in communication with the cathode oxidant inlet, and means for recycling at least part of an exhaust gas stream emanating from the anode exhaust gas outlet to the anode fuel inlet. Such means comprise a heat exchanger in communication with the anode exhaust gas outlet, a condenser in communication with the heat exchanger and a combustor in communication with the heat exchanger and the anode fuel inlet. Preferably, the system includes a reformer in communication with the anode exhaust gas outlet and the heat exchanger.

9 Claims, 3 Drawing Sheets

SOLID ELECTROLYTE FUEL CELL POWER GENERATING SYSTEM

FIELD OF THE INVENTION

The invention relates to a solid electrolyte fuel cell (hereinafter referred to as "SOFC") power generating system which preferably utilizes hydrogen or a gaseous hydrocarbon as the fuel and air as the oxidant. The efficiency of the system is significantly improved by recycling at least part of the exhaust gases which emanate from the fuel cell. The invention is also applicable to phosphoric acid and molten carbonate salt fuel cell power generating systems.

BACKGROUND OF THE INVENTION

In a typical solid electrolyte fuel cell, power generation occurs as a result of the reactions set forth below in which the fuel cell utilizes hydrogen or a gaseous hydrocarbon as the fuel and air as the oxidant, while operating the fuel cell at high temperatures of about 1,000° C.

When using methane as the fuel, power generation occurs as the result of the following reactions:

$$CH_4 + H_2O \rightarrow CO + 3H_2 \quad (1)$$

$$CO + H_2O \rightarrow CO_2 + H_2 \quad (2)$$

$$H_2 + \tfrac{1}{2}O_2 \rightarrow H_2O \quad (3)$$

Reaction (1) is typically referred to as a fuel reforming reaction. Reaction (2) is typically referred to as a CO shift reaction. Reaction (3) is a redox reaction which results in the generation of power.

If the fuel is hydrogen, only Reaction (3) is applicable. If a gaseous hydrocarbon such as methane is used as the fuel, it is partially or completely converted to a hydrogen-containing gas in accordance with Reactions (1) and (2) before being supplied to the fuel cell for power generation. Since $H_2O$ must be supplied for Reaction (1) and since $H_2O$ is produced in Reaction (3), it is seen that recycling of the exhaust gas containing $H_2O$ is desirable.

In considering the possibility of recycling the exhaust gas which emanates from the SOFC operated in accordance with Reactions (1), (2) and (3), the following factors are applicable:

(a) utilization of a gas in the system for supplying $H_2O$;

(b) improving energy efficiency by recovering the exhaust heat of the exhaust gas at a high temperature; and (c) improving energy efficiency by recovering and recycling fuel not used for power generation.

However, it should be noted that in the course of recycling of the exhaust gas which emanates from the SOFC, the electromotive voltage decreases at the anode as the vapor partial pressure increases such that power generation efficiency decreases. The problem therefore is to provide a method for recycling the exhaust gas emanating from the SOFC operating with hydrogen or a gaseous hydrocarbon as the fuel and air as the oxidant at a high temperature of about 1,000° C. without any diminution in power generating efficiency.

Methods are known in the prior art for recycling the exhaust gas, e.g. ejector method, high temperature blower method and turbo compressor method, etc. However, these methods suffer from several drawbacks. Two main disadvantages of the prior art methods are:

1) There is a limitation on the amount of a gas to be to be recycled to the entrance to the fuel cell anode such that the exhaust gas includes a significant amount of unreacted hydrogen or gaseous hydrocarbon fuel, thus lowering the power generation efficiency.

2) The partial vapor pressure in the anode increase during the course of exhaust gas recycling, thereby lowering the electromotive force and reducing the power generation performance of the fuel cell.

The particular disadvantages of the ejector method of recycling the exhaust gas are discussed below with reference to FIG. 3. The use of a circulating blower or turbo compressor has been suggested to overcome these disadvantages. However, these latter two devices are not applicable to a SOFC which operates at a high temperature of about 1,000° C.

SUMMARY OF THE INVENTION

The present invention overcomes the disadvantages associated with the prior art methods discussed above by recycling at least a part of the exhaust gas emanating from a SOFC back to the fuel cell anode entrance via a regeneration heat exchanger and a condenser.

DETAILED DESCRIPTION OF THE INVENTION

Figure 1:
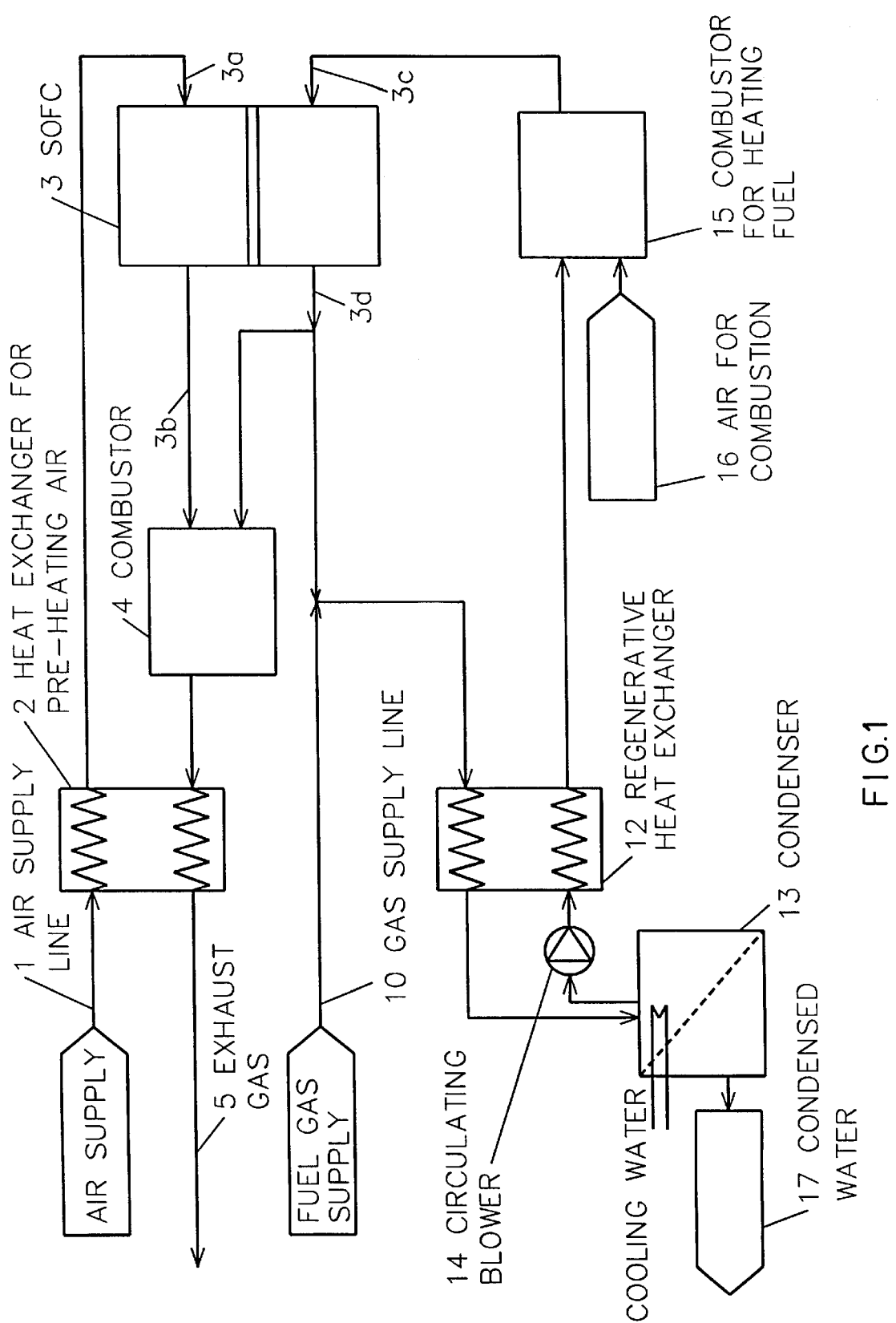
FIG. 1 is a schematic view of a first embodiment of a SOFC power generating system of the invention.

The solid electrolyte fuel cell power generation system of the invention comprises:

a) a solid electrolyte fuel cell containing an anode, an anode fuel inlet and an anode exhaust gas outlet, a fuel source in communication with the anode inlet, a cathode, a cathode oxidant inlet and a cathode exhaust oxidant outlet, an oxidant source in communication with the cathode oxidant inlet; and b) means for recycling at least part of an exhaust gas stream emanating from the anode exhaust gas outlet to the anode inlet, said means comprising a first heat exchanger in communication with the anode exhaust gas outlet, a condenser in communication with the first heat exchanger and a first combustor in communication with the first heat exchanger and the anode inlet.

The fuel cell (SOFC) design is conventional in nature. For example, the fuel may be any of the typical prior art designs such as the seal-less tubular design, segmented-cell-in-series design, monolithic design, flat-plate design, etc.

Preferably, the means for recycling at least part of the exhaust gas stream which emanates from the exhaust gas outlet further includes a reformer in communication with the fuel source, the anode exhaust gas outlet and the first heat exchanger. It is also preferred that such means additionally includes a second combustor in communication with the cathode air exhaust outlet for combusting: (a) an oxidant exhaust stream emanating from the cathode oxidant exhaust outlet and (b) at least part of the anode exhaust gas stream emanating from the anode exhaust gas outlet, said second combustor also being in communication with a second heat exchanger which is in communication with the oxidant source and the cathode oxidant inlet.

The fuel for the fuel cell ("SOFC") is typically hydrogen or a gaseous hydrocarbon such as methane, and the oxidant is preferably air. In the case of a methane/air SOFC, inclusion of a reformer between the exhaust gas outlet and the first heat exchanger is desirable.

Preferably, only part, e.g. 20 to 50%, of the exhaust gas stream emanating from the exhaust gas outlet is recycled back to the anode inlet. All or part of the remainder of the exhaust gas stream is combusted, and the combustion products are heat-exchanged so as to heat the oxidant, e.g. air, prior to passing the oxidant to the oxidant inlet.

The method by which the fuel cell power generating system operates and recycling occurs may be summarized by the following steps:

a) heat exchanging at least part of an exhaust gas stream which emanates from the exhaust gas outlet;

b) condensing the resultant heat-exchanged exhaust gas stream; and c) recycling the resultant condensate to the fuel inlet.

In regard to the above-indicated steps, it is preferred that the fuel comprises a gaseous hydrocarbon, such as methane, and the oxidant comprises air. In respect to a methane/air SOFC, it is preferred that at least part of the exhaust gas stream which emanates from the exhaust gas outlet is reformed prior to being heat-exchanged. It is also preferred that at least part of the exhaust gas stream which emanates from the exhaust gas outlet is combusted and the combusted exhaust gas stream is thereafter heat-exchanged so as to transfer the heat of combustion to the air which is thereafter passed to the cathode inlet.

The SOFC employed in the power generating system of the invention will desirably operate at high temperatures, e.g. about 900 to 1,100° C. Other operating parameters of the SOFC are discussed below with reference to FIG. 1.

FIG. 1 shows a fuel cell power generating system of the invention in the form of a schematic diagram. The solid electrolyte fuel cell ("SOFC") 3 contains an anode (not shown) and a cathode (not shown) is capable of generating 100 kW at an inlet temperature of 925° C. and an outlet temperature of 1020° C. and a pressure of 1 atmosphere.

The fuel which may be hydrogen or a gaseous hydrocarbon such as methane is admitted to an inlet of fuel cell 3 through line 10 which is in communication with the anode. After power generation, a part of the fuel exhaust gas which exits an anode outlet of fuel cell 3 through line 3d is recirculated to the fuel cell anode inlet entrance 3c via regeneration heat exchanger 12 and condenser 13. After partial removal of the water from the mixed gases in condenser 13, the mixed fuel is re-introduced into heat exchanger 12 by circulating blower 14. The gases are then passed into combustor 15 and are combusted therein. Air from tank 16 is fed into combustor 15 and the exhaust gases are fed through line 3c into fuel cell 3 where power generation takes place.

The fuel is fed from a fuel tank through line 10 at a temperature of 25° C. and a flow rate of 17.2 m³/h at a pressure of one atmosphere and mixed a gas for recycling obtained from the combustion exhaust gas from fuel cell anode exit 3d. Typically, the make-up of the constituents flowing into fuel cell 3 will be: methane 4.4%, hydrogen 11.3%, carbon monoxide 29.2%, carbon dioxide 34.05%, water 9.62% and nitrogen 11.3% while the make-up of the constituents flowing out of fuel cell 3 will be: methane 0.0%, hydrogen 8.35%, carbon monoxide 28.6%, carbon dioxide 34.00%, water 18.88% and nitrogen 10.3%.

The oxidant, e.g. air, is supplied from line 1, then heated by using combustion exhaust gas from combustor 4 which exits from heat exchanger 2 in order to preheat the air. The air is blown through the combustor 4 and heat exchanger 2 and is supplied to fuel cell cathode entrance 3a of fuel cell 3 at atmospheric pressure, The air is initially at a temperature of 25° C. and a flow rate of 633 m³/h prior to entering combustor 4. Air and exhaust gas exits from cathode exit 3b of fuel cell 3 and combustion exhaust gas not used for recycling from fuel cell anode exit 3d is supplied to combustor 4. The gases exit as exhaust gases through line 5 after being heat exchanged in heat exchanger 2 used for preheating air admitted through line 1.

Typically, the air entering heat exchanger 2 enters at 25° C. through line 1 and exits at a temperature of 925° C. The gases exiting combustor 4 will typically be at a temperature of 1170° C. and the exhaust gases exiting heat exchanger 2 will typically be at a temperature of 418° C.

Typically, in regenerative heat exchanger 12, the stream of gases enter at a temperature of 800° C., are heat exchanged and enter condenser 13 at 117° C. and exit at 45° C. The temperature in condenser 13 is typically maintained at 45° C. by means of water from tank 17. Typically, water vapor is removed from condenser 13 at a rate of 1.88 m³/h. If the temperature of condenser 13 is kept lower than 45° C., a larger volume of water vapor can be removed from the condenser. Usually, river water, sea water or closed cycle cooling tower water is used as the condenser coolant. The temperature of these water sources range from 15 to 35° C., while the temperature of condenser 13 will range from about 25 to 45° C.

The gases enter combustor 15 at a temperature of 780° C. and the temperature is increased to 925° C. by introducing air from tank 16 at a flow rate of 5.42 m³/h. The foregoing rates may be varied, e.g. the amount of the gas to be recycled may be varied by controlling the flow through circulating blower 14. Furthermore, the vapor partial pressure of the fuel gas may be varied by controlling the operating temperature of condenser 13.

It should be noted that in the system shown in FIG. 1, blower 14 directly determines the flow rate of the gas through line 3c. If the flow rate of the blower is adjusted to x m³/h and the fuel flow rate in line 10 is adjusted to y m³/h, the recycle ratio becomes x/y, and the same flow rate of y m³/h will automatically be discharged to combustor 4.

Figure 2:
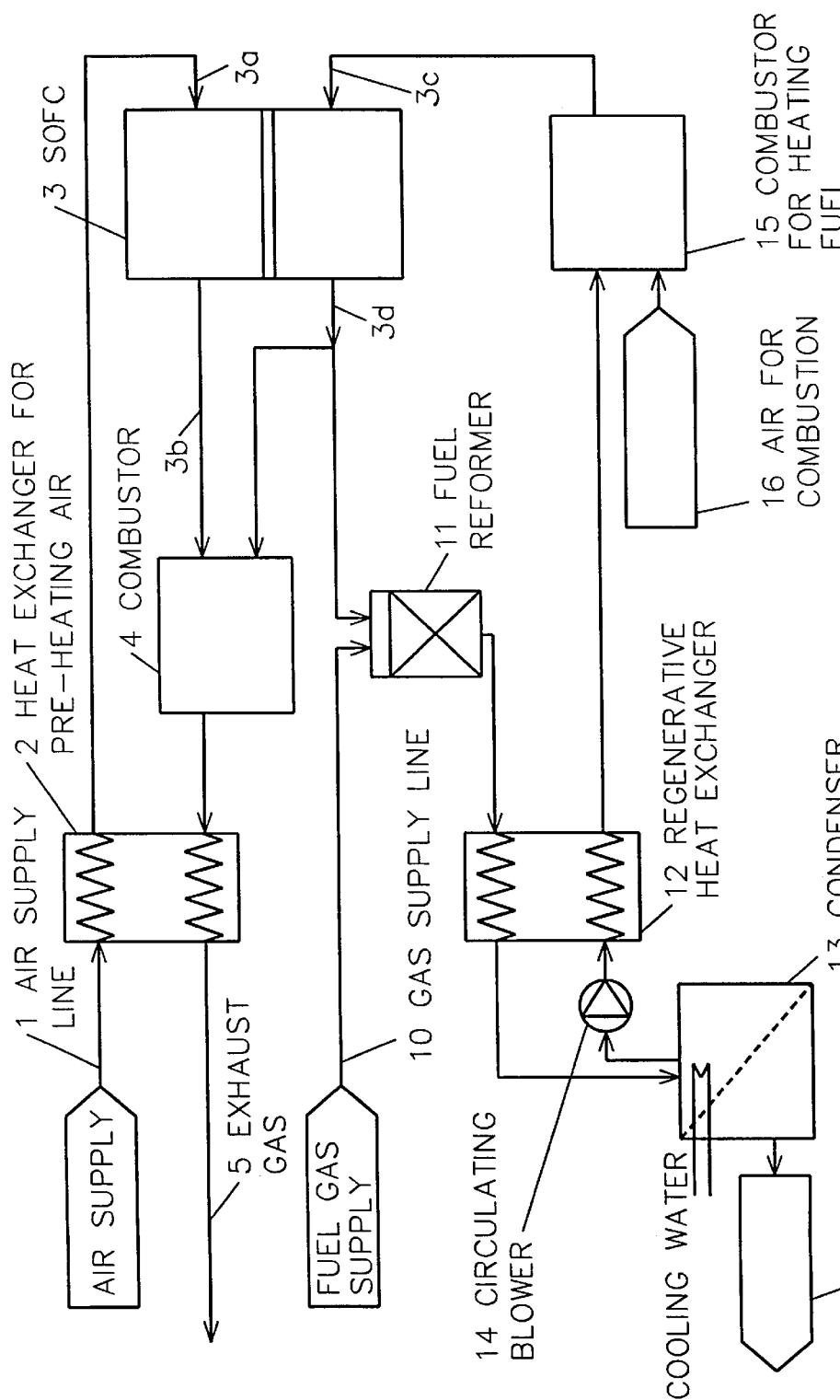
FIG. 2 is a schematic view of a second embodiment of a SOFC power generating system of the invention.

FIG. 2 shows a fuel cell power generating system of the invention in the form of a schematic diagram which is similar to that shown in FIG. 1. The principal difference is that in FIG. 2, fuel reformer 11 is positioned upstream of heat exchanger 12. Thus fuel from line 10 together with recycled exhaust gas from line 3d enter reformer 11 wherein reformation reactions are efficiently conducted due to the high temperature and the high partial vapor pressure of the mixed gas.

Without the use of fuel reformer 11, fuel is introduced into fuel cell 3 without being converted to hydrogen. In such case, vapor generated along with power inside fuel cell 3 can be utilized for reformation by means of the reformation reaction illustrated below. The reformation reaction is an endothermic reaction in which the heat of the cell is absorbed such that a high level of performance occurs:

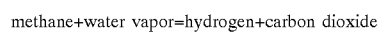

methane+water vapor=hydrogen+carbon dioxide

Thus it is seen that by using fuel reformer 11, the fuel is reformed to hydrogen and carbon dioxide prior to introduction into fuel cell 3. Therefore, heat will be generated inside the cell, necessitating cooling. Heat required for the reformation reaction must be supplied from the outside. However, exhaust heat can be efficiently utilized as the requisite heat source. Accordingly the inside of the cell can be cooled without wasting any heat.

Typically, the fuel cell power generating system shown in FIG. 2 will generate 100 kW at an inlet temperature of 925° C. and an outlet temperature of 1020° C. and a pressure of one atmosphere. In the system in FIG. 2, typically, the make-up of the constituents flowing into fuel cell 3 will be: methane 0.0%, hydrogen 22.8%, carbon monoxide 25.2%, carbon dioxide 30.0%, water 10.0% and nitrogen 12.0% while the make-up of the constituents flowing out of fuel cell 3 will be: methane 0.0%, hydrogen 8.35%, carbon monoxide 28.6%, carbon dioxide 34.00%, water 18.88% and nitrogen 10.3%.

Figure 3:
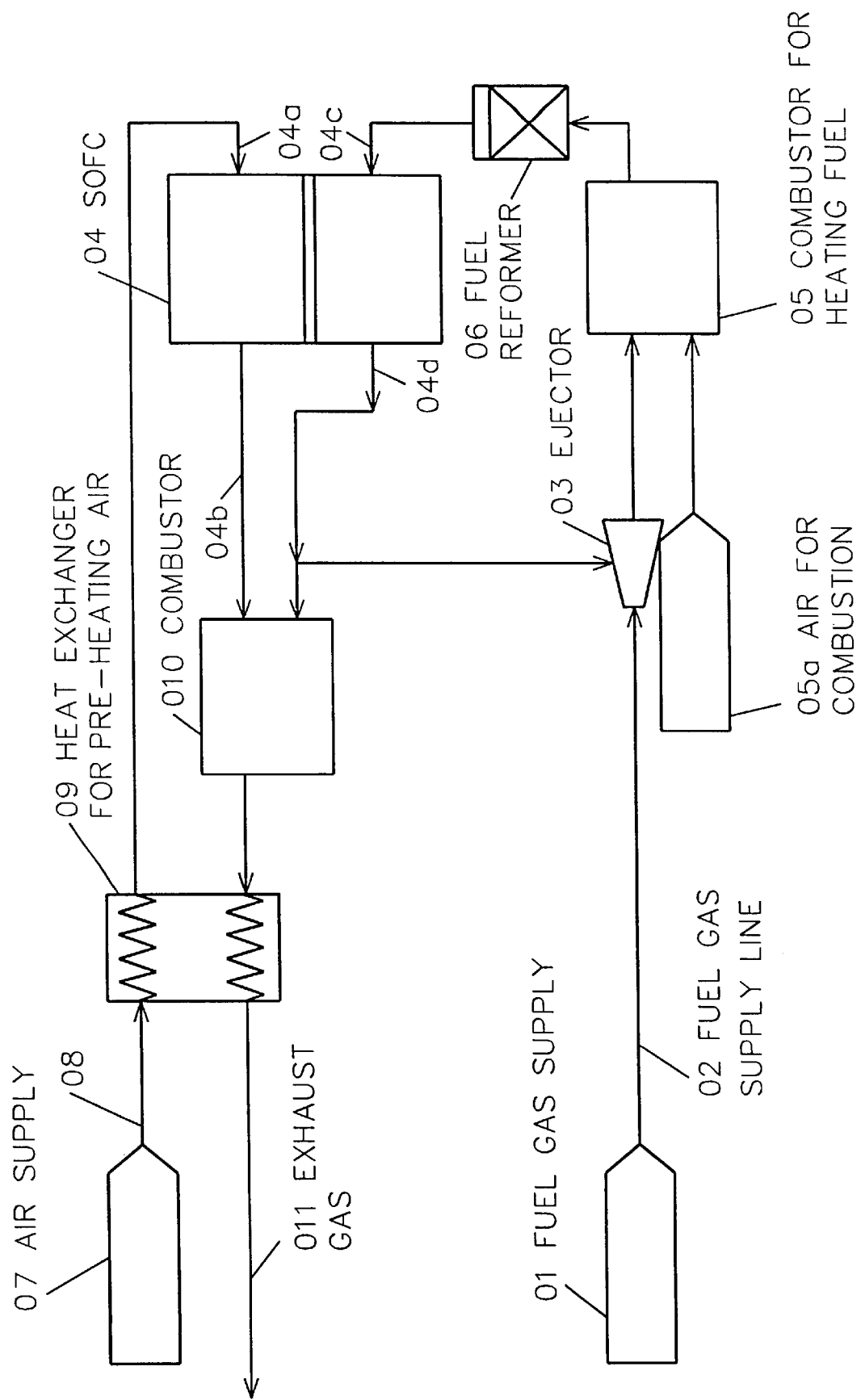
FIG. 3 is a schematic view of a conventional SOFC power generating system utilizing the ejector method of recycling the exhaust gas.

FIG. 3 shows a conventional fuel cell power generating system of the invention in the form of a schematic diagram which corresponds to that disclosed in Japanese patent disclosure no. 162135.

In FIG. 3, gaseous fuel is supplied from fuel tank 01 through line 02 to ejector 03 in which the incoming gaseous fuel is mixed with part of the recycled exhaust gas fuel emanating from anode exit 04d of fuel cell 04 (SOFC) under conditions such that the pressure of the incoming gaseous fuel from tank 01 serves as the driving force. Mixed fuel is supplied to fuel cell anode entrance 4c from fuel reformer 06 which is fed by gases emanating from combustor 05 to which air is fed from supplemental air tank 05a.

The recycled fuel exhaust gas includes $H_2O$ formed in fuel cell 04 and such $H_2O$ is used for recycling and for fuel reformation. In the fuel cell power generating system shown in FIG. 3, the recycled exhaust gas stream has a high temperature of about 1,000° C. such that the sensible heat of the recycled gas is used for increasing the temperature of the fuel which is admitted into ejector 3.

The air exhaust gas emanating from a cathode exit of fuel cell 04 via line 04b together with that portion of the exhaust gas flowing through line 04d which is not recycled to ejector 03 are fed into combustor 010 in order to heat up the air for the cathode.

Supply air is fed from supply air tank 07 through line 08 to heat exchanger 09. The gases which emanate from combustor 010 are fed into heat exchanger 09 and heat is transferred therein to preheat the supply air which is then fed through line 04a to a cathode entrance of fuel cell 04. The exhaust from heat exchange 09 is vented through line 011; an air compressor or blower (not shown) is located upstream of heat exchange 09 to provide the driving force for the supply air to fuel cell 04.

In the solid electrolyte fuel cell power generating system of the invention, a portion of the fuel exhaust gas which emanates from an anode exit of the SOFC after power generation is recycled to an anode entrance of the SOFC via a regeneration heat exchanger and a condenser which lowers the partial vapor pressure of the recycled gas. As a result, the electromotive force of the cell is prevented from being reduced and the efficiency of the system is increased.

As noted above, in the solid electrolyte fuel cell power generating system of the invention, a portion of the high-temperature exhaust gas emanating from the anode exit of the SOFC is first cooled by heat exchange in a regeneration heat exchanger with a low-temperature recycled gas. The low-temperature recycled gas was further cooled in a condenser such that excessive water in the exhaust gas is removed by condensation. As a result, the partial vapor pressure of the recycled exhaust gas stream can be maintained at a low level, and the performance of the system can be improved, thereby increasing the electromotive force which can be derived from the system.

A further attribute of the system of the invention is that the circulating blower, through which the gases pass after exiting the condenser, operates at room temperature, thereby permitting adjustment of the flow rate through the blower over a wide range. In addition, unreacted hydrogen and hydrocarbons in the exhaust gas which emanates from the fuel cell can be efficiently utilized, thereby improving the level of power generation which can be derived from the system.

Additionally, it should be noted that in the system of the invention, the regeneration heat exchanger positioned downstream of the circulating blower does not entail any extra energy consumption since cooling and heating of the recycled exhaust gas can be performed with respective sensible heat retention. Accordingly, the system of the invention operates with a high level of efficiency.

It should be understood that the particular features and parameters set forth above are for illustrative purposes and not by way of limitation. The solid electrolyte power generation system of the invention is defined by the claims which follow.

What is claimed is:

1. A solid electrolyte fuel cell power generating system comprising:

a) a solid electrolyte fuel cell containing an anode, an anode fuel inlet and an anode exhaust gas outlet, a fuel source in communication with the anode inlet, a cathode, a cathode oxidant inlet and a cathode exhaust oxidant outlet, an oxidant source in communication with the cathode oxidant inlet; and apparatus for recycling at least part of an anode exhaust gas stream emanating from the anode exhaust gas outlet to the anode inlet, said apparatus comprising a heat exchanger in communication with the anode exhaust gas outlet, a condenser in communication with said heat exchanger for condensing water vapor from said anode exhaust gas stream at a condensing temperature below the temperature of said anode exhaust gas stream at the anode exhaust gas outlet, a first combustor in communication with said heat exchanger and the anode inlet and a low temperature blower for controlling the recycle rate of flow of the anode exhaust gas stream into said first combustor and the flow rate of gas into the anode inlet.

2. The system of claim 1, wherein said apparatus further includes a second combustor in communication with the cathode exhaust oxidant outlet for combusting: (a) an oxidant exhaust stream emanating from the cathode exhaust oxidant outlet and (b) at least part of the anode exhaust gas stream emanating from the anode exhaust gas outlet, said second combustor also being in communication with the oxidant source and the cathode oxidant inlet.

3. A method of operating a solid electrolyte fuel cell power generating system which utilizes hydrogen or a gaseous hydrocarbon as a fuel source and an oxidant source, said fuel cell containing an anode, an anode fuel inlet in communication with the fuel source and an anode exhaust gas outlet, a cathode, a cathode oxidant inlet in communication with the oxidant source and a cathode exhaust oxidant outlet, which comprises:

a) passing at least part of an anode exhaust gas stream which emanates from the anode exhaust gas outlet through a first heat exchanger;

b) condensing water vapor from the anode exhaust gas stream at a condensing temperature below the temperature of the anode exhaust gas stream at the anode exhaust gas outlet;

c) blowing the gas stream emanating from said first heat exchanger at low temperature through a combustor; and d) recycling the combusted gas to the anode fuel inlet.

4. The method of claim 3, wherein the fuel source comprises a gaseous hydrocarbon.

5. The method of claim 4, wherein the gaseous hydrocarbon comprises methane.

6. The method of claim 3, wherein the cathode oxidant comprises air.

7. The method of claim 3, wherein said cathode exhaust oxidant outlet emanates an exhaust gas stream which is reformed prior to being heat-exchanged.

8. The method of claim 3, wherein at least part of an oxidant exhaust gas stream which emanates from the cathode exhaust oxidant outlet is combusted and the combusted exhaust gas stream is thereafter heat-exchanged so as to transfer the heat of combustion therefrom to the oxidant source which is passed to the cathode oxidant inlet.

9. The method of claim 3, wherein the fuel cell is operated at a temperature in the range of about 900 to 1,100° C.

* * * * *